United States Patent
Asher et al.

(10) Patent No.: US 10,497,208 B2
(45) Date of Patent: Dec. 3, 2019

(54) CREDIT ALLOCATION SYSTEM

(75) Inventors: Joseph M. Asher, New York, NY (US); Robert F. Bahrampour, New York, NY (US)

(73) Assignee: CFPH, LLC, New York, NY (US)

( * ) Notice: Subject to any disclaimer, the term of this patent is extended or adjusted under 35 U.S.C. 154(b) by 1638 days.

(21) Appl. No.: 12/903,112

(22) Filed: Oct. 12, 2010

(65) Prior Publication Data

US 2011/0029399 A1 Feb. 3, 2011

Related U.S. Application Data

(63) Continuation of application No. 11/256,568, filed on Oct. 21, 2005, now Pat. No. 7,811,172, and a
(Continued)

(51) Int. Cl.
| | |
|---|---|
| *G07F 17/00* | (2006.01) |
| *G07F 17/32* | (2006.01) |
| *G06Q 20/10* | (2012.01) |
| *G06Q 20/32* | (2012.01) |
| *G06Q 20/40* | (2012.01) |
| *G06Q 30/06* | (2012.01) |
| *G06Q 40/00* | (2012.01) |

(52) U.S. Cl.
CPC ....... *G07F 17/3237* (2013.01); *G06Q 20/102* (2013.01); *G06Q 20/3224* (2013.01); *G06Q 20/40* (2013.01); *G06Q 30/0601* (2013.01); *G06Q 40/12* (2013.12); *G07F 17/32* (2013.01); *G07F 17/329* (2013.01); *G07F 17/3218* (2013.01)

(58) Field of Classification Search
CPC ......... H04M 1/00; A63B 69/36; G07F 7/1008
See application file for complete search history.

(56) References Cited

U.S. PATENT DOCUMENTS

| 4,882,473 A | 11/1989 | Bergeron et al. |
| 5,001,632 A | 3/1991 | Hall-Tipping |
| (Continued) | | |

FOREIGN PATENT DOCUMENTS

| GB | 2394675 | 5/2004 |
| JP | 2003-518677 | 6/2003 |
| (Continued) | | |

OTHER PUBLICATIONS

Defendants' Joint Unenforceability and Invalidity Contentions dated Mar. 21, 2017 (51 pages).
(Continued)

*Primary Examiner* — Paul A D'Agostino

(57) ABSTRACT

A system and method for determining credit for a sale is provided. The system determines a location of the electronic communication device at the time of the sale. The system determines, for each of a plurality of retailers, a distance between (a) the location of the electronic communication device at the time of the sale and (b) a location of the respective retailer. The system determines the credit based at least partially on the determined distance between the location of the electronic communication device at the time of the sale and the location of each respective retailer. The system provides the credit to the one or more retailers.

18 Claims, 1 Drawing Sheet

Related U.S. Application Data continuation of application No. 11/199,831, filed on Aug. 9, 2005, now Pat. No. 7,637,810, and a continuation of application No. 11/063,311, filed on Feb. 21, 2005, now Pat. No. 8,616,967, which is a continuation-in-part of application No. 10/835,995, filed on Apr. 29, 2004, now Pat. No. 8,092,303, application No. 12/903,112, which is a continuation-in-part of application No. 11/199,831, filed on Aug. 9, 2005, now Pat. No. 7,637,810, and a continuation-in-part of application No. 11/063,311, filed on Feb. 21, 2005, now Pat. No. 8,616,967, which is a continuation-in-part of application No. 10/835,995, filed on Apr. 29, 2004, now Pat. No. 8,092,303.

(60) Provisional application No. 60/697,861, filed on Jul. 8, 2005, provisional application No. 60/549,187, filed on Mar. 1, 2004, provisional application No. 60/547,507, filed on Feb. 25, 2004.

(56) References Cited

U.S. PATENT DOCUMENTS

| | | | |
|---|---|---|---|
| 5,599,231 | A | 2/1997 | Hibino et al. |
| 5,618,045 | A | 4/1997 | Kagan et al. |
| 5,618,232 | A | 4/1997 | Martin |
| 5,645,277 | A | 7/1997 | Cheng |
| 5,738,583 | A | 4/1998 | Comas et al. |
| 5,779,549 | A | 7/1998 | Walker |
| 5,787,156 | A | 7/1998 | K atz |
| 5,806,849 | A | 9/1998 | Rutkowski |
| 5,816,918 | A | 10/1998 | Kelly et al. |
| 5,999,808 | A | 2/1999 | LaDue |
| 5,881,366 | A | 3/1999 | Bodernmann et al. |
| 6,001,015 | A | 12/1999 | Nishiumi et al. |
| 6,044,062 | A | 3/2000 | Brownrigg et al. |
| 6,178,510 | B1 | 1/2001 | O'Connor et al. |
| 6,320,495 | B1 | 11/2001 | Sporgis |
| 6,359,661 | B1 | 3/2002 | Nickum |
| 6,508,710 | B1 | 1/2003 | Paravia |
| 6,618,706 | B1 * | 9/2003 | Rive et al. .................. 705/30 |
| 6,645,077 | B2 | 11/2003 | Rowe |
| 6,843,725 | B2 | 1/2005 | Nelson |
| 6,868,396 | B2 * | 3/2005 | Smith et al. ............. 705/26.9 |
| 7,577,847 | B2 | 8/2009 | Nguyen |
| 7,811,172 | B2 | 10/2010 | Asher et al. |
| 8,221,225 | B2 | 7/2012 | Laut |
| 8,267,789 | B2 | 9/2012 | Nelson |
| 8,287,380 | B2 | 10/2012 | Nguyen |
| 8,393,948 | B2 | 3/2013 | Allen |
| 8,764,566 | B2 | 7/2014 | Miltenberger |
| 2002/0087505 | A1 | 7/2002 | Smith |
| 2002/0147049 | A1 | 10/2002 | Carter |
| 2003/0125973 | A1 | 7/2003 | Mathews |
| 2003/0148812 | A1 | 8/2003 | Paulsen |
| 2003/0212996 | A1 * | 11/2003 | Wolzien .................... 725/60 |
| 2004/0005919 | A1 | 1/2004 | Walker |
| 2004/0067760 | A1 | 4/2004 | Menjo et al. |
| 2004/0111369 | A1 * | 6/2004 | Lane et al. ................ 705/40 |
| 2004/0152511 | A1 | 8/2004 | Nicely |
| 2004/0162124 | A1 | 8/2004 | Barton |
| 2004/0242322 | A1 | 12/2004 | Montagna |
| 2005/0190901 | A1 * | 9/2005 | Oborn et al. ........ 379/114.02 |
| 2005/0215306 | A1 * | 9/2005 | O'Donnell et al. ......... 463/17 |
| 2005/0251440 | A1 * | 11/2005 | Bednarek .................. 705/10 |
| 2006/0136296 | A1 * | 6/2006 | Amada ..................... 705/14 |
| 2006/0173754 | A1 * | 8/2006 | Burton et al. .............. 705/27 |
| 2006/0184417 | A1 * | 8/2006 | Van der Linden et al. .... 705/14 |
| 2006/0293965 | A1 * | 12/2006 | Burton ..................... 705/26 |
| 2007/0130044 | A1 * | 6/2007 | Rowan ..................... 705/37 |
| 2008/0096628 | A1 | 4/2008 | Czyzewski et al. |
| 2010/0023372 | A1 * | 1/2010 | Gonzalez .................. 705/10 |
| 2010/0069144 | A1 | 3/2010 | Curtis |

FOREIGN PATENT DOCUMENTS

| | | |
|---|---|---|
| WO | WO 95/24689 | 9/1995 |
| WO | WO 2001/017262 | 3/2001 |
| WO | WO 2001/40978 | 6/2001 |
| WO | WO 01/77861 | 10/2001 |
| WO | WO 2002/065750 | 8/2002 |
| WO | WO 2004/109321 | 12/2004 |

OTHER PUBLICATIONS

IPR Decision for U.S. Pat. No. 9,306,952, Case IPR2017-01333, Nov. 13, 2017 (30 pages).
Patent Owner's Preliminary Response for U.S. Pat. No. 9,306,952, Case IPR2017-01333, dated Aug. 16, 2017 (49 pages).
Petition for Inter Partes Review of U.S. Pat. No. 9,306,952, Case IPR2017-01333, May 1, 2017 (74 pages).
IPR Decision for U.S. Pat. No. 9,355,518, Case IPR2017-01532, Dec. 13, 2017 (29 pages).
Patent Owner's Preliminary Response for U.S. Pat. No. 9,355,518, Case IPR2017-01532, dated Sep. 19, 2017 (27 pages).
Petition for Inter Partes Review of U.S. Pat. No. 9,355,518, Case IPR2017-01532, Jun. 8, 2017 (74 pages).
ImagiNation—OnLine Games, 1995, 58 pages.
ImagiNation, 1993 ImagiNation Network—A Quick Guide to Using Your Imagination, 16 pages.
ImagiNation Network [R] General Documentation (INN), 27 pages.
BYTE Magazine, Mar. 1984, vol. 9, No. 3 (552 pages).
IBM Technical Reference, 1st Ed. Revised, Nov. 1983 (572 pages).
IBM PC Jr. Advertising Booklet, 1983, 14 pages.
IBM PC Jr. Order Form, Nov. 1983, 2 pages.
Sierra 3-D Animated Adventure Game Reference Card for MS DOS, 1987 (4 pages).
Leisure Suit Larry in the Land of the Lounge Lizards Manual, Jun. 4, 1987, 13 pages.
Electronic Gaming Monthly, No. 89, Dec. 1996 (352 pages).
Wireless Pro Fighter 8 Box Cover (1 page), Dec. 1996.
Naki Wireless Pro Fighter 8 controller (1 page), Dec. 1996.
Sega Saturn Instruction Manual (24 pages), May 11, 1995.
Sega Saturn Overview Manual (67 pages), Jun. 27, 1995.
Sega Saturn Overview Manual unlocked (67 pages), Jun. 27, 1995.
Sega Saturn Introduction Manual (10 pages), Jun. 27, 1995.
Game FAQs: Tokimeki Memorial: Forever With You, Dec. 13, 1996 (17 pages).
How to get the most out of CompuServe, Charles Bowen and David Peyton, 1986 (58 pages).
Alfred Glossbrenner's Master Guide to Compuserve, 1987 (25 pages).
CompuServe Information Service Users Guide, Sep. 1986 (42 pages).
The Official Guide to the Prodigy Service, John L. Vierscas, 1998 (77 pages).
Wireless Gaming Makes Strides in Nevada by Libe Goad, PCMag.com, Jun. 9, 2005 (3 pages).
Guinn gives OK to wireless gaming devices in casinos by Elizabeth White, Las Vegas Sun, Jun. 2, 2005 (8 pages).
Welcome to Cantor Casino, Wayback machine, Oct. 2005 (1 page).
Hand-held devices next wave in gaming, The Times, Aug. 12, 2005 (1 page).
Rolling the dice, Casinos ready to put their money on wireless gaming devices, The Journal News, Nov. 14, 2005 (2 pages).
Nevada Oks gambling on the go, The Courier Journal, Apr. 2, 2006 (1 page).
Devices could bring mobile gaming to casinos, Reno Gazette-Journal, Mar. 24, 2006 (2 pages).
Regulators approve wireless device by Ryan Randazzo, Reno Gazette Journal, Aug. 25, 2006.
Nevada Gaming Commission Mobile Gaming Policies, May 18, 2006 (5 pages).
Handheld gambling devices will show up soon in casinos by the Associated Press in the Florida Today Newspaper Aug. 3, 2005 (1 page).

(56) References Cited

OTHER PUBLICATIONS

Cantor Fitzgerald Press Release—Cantor Fitzgerald Launches Cantor Casino and Cantor Gaming, Sep. 29, 2005 (2 pages).
Coming to a Nevada casino soon: Playing the slots wirelessly, by the New York Times in the Arizona Republic Newspaper—Fox Butterfield, Jul. 4, 2005 (1 page).
Minutes of the Meeting on the Assembly Committee on Judiciary, Seventy-Third Session, Apr. 8, 2005 (42 pages).
02 and Cantor Index bring gambling to PDAs by Jo Best of ZDNet, Sep. 3, 2003 (6 pages).
Stocking fillers by Ashley Norton of the Guardian, Sep. 20, 2003 (5 pages).
O2 XDA II Coming November by Fabrizio Pilato of Mobile Mag, Oct. 23, 2003 (6 pages).
Securities and Exchange Commission—The XDA II from O2 Corners a Third of the Market in First Six Months Jul. 15, 2004 (3 pages).
Final Notice to Cantor Index Limited from the Financial Services Authority, Dec. 30, 2004 (13 pages).
Handheld devices can be used for games in Casino public areas by the Associated Press in NBC News, Mar. 24, 2006 (2 pages).
Nevada approves new mobile gambling rules, GMA News Online, Mar. 24, 2006 (5 pages).
Legalized Gambling as a Strategy for Economic Development by Robert Goodman Mar. 1994 (225 pages.
New York Times—Two inventors contend that the V-chip is an idea they've seen before—in their own patent.—By Teresa Riordan Oct. 28, 1996 (4 pages).
Wireless ATM & Ad-Hoc Networks by C-K Toh, Dec. 31, 1996 (23 pages).
PC Mag—Wireless Gaming Makes Strides in Nevada, Jun. 9, 2005 (3 pages).
The Times Money, Hanld-held devices next wave in gaming, Aug. 12, 2005 (1 page).
AOL—The Official America Online Tour Guide for Windows 3.1, 1996 Tom Lichty, Jul. 1996 (14 pages).
Business Wire—Diamond I Opens Online Interactive Demo of its WifiCasino GS Gaming System, Apr. 27, 2005 (3 pages).
Diamond I PRN Wire Diamond I Comments on Future of Hand-held Gambling Devices in Nevada, Jun. 2, 2005 (4 pages).
Diamond I Rolls the Dice by Naomi Graychase, Feb. 23, 2005 (3 pages).
Diamond I Opens Online Interactive Demo of its WifiCasino GS Gaming System, Business Wire, Apr. 27, 2005 (3 pages).
Diamond I Responds to Inquiries: What is "WifiCasino GS"?, Business Wire, Jan. 27, 2005 (3 pages).
Diamond I Technologies—Products, Wayback Machine, Apr. 29, 2005-Aug. 12, 2007, (2 pages).
Diamond I Technologies—Products, Wayback Machine, Apr. 29, 2005-Jan. 6, 2010, (2 pages).
Kidnet, Kid's Guide to Surfing through Cyberspace by Brad and Debra Schepp—Nov. 1995 (9 pages).
The New York Times—Nintendo and Minnesota Set a Living-Room Lottery Test, Sep. 27, 1991, (4 pages).
The New York Times—Minnesota Cancels Plan to Play Lottery on Nintendo, Oct. 19, 1991 (3 pages).
Case 2:16-cv-00856-RCJ-VCF, Document 1, "Plaintiffs' Complaint for Patent Infringement" filed Apr. 14, 2016 (39 pages).
Case 2:16-cv-00856-RCJ-VCF, Document 19, "Plaintiffs' First Amended Complaint for Patent Infringement", filed Jul. 11, 2016 (57 pages).
Case 2:16-cv-00856-RCJ-VCF, Document 23, "Defendant 888's Motion to Dismiss Plaintiffs First Amended Complaint Under Fed. R. Civ. P. 12(B)(6)", filed Aug. 12, 2016 (22 pages).
Case 2:16-cv-00856-RCJ-VCF, Document 26, "Defendant's Notice of Joinder to Motions to Dismiss in Related Cases", filed Aug. 12, 2016 (4 pages).
Case 2:16-cv-00856-RCJ-VCF, Document 36, "Plaintiffs' Opposition to 888 Holdings PLC's Motion to Dismiss", filed Sep. 8, 2016 (32 pages).
Case 2:16-cv-00856-RCJ-VCF, Document 37, "Index of Exhibits to Plaintiffs' Opposition to Defendant's Motion to Dismiss" filed Sep. 8, 2016 (3 pages).
Case 2:16-cv-00856-RCJ-VCF, Document 45, Defendant 888's Reply in Support to Dismiss Plaintiffs' First Amended Complaint Under Fed. R. Civ. P. 12(B)(6), filed Sep. 26, 2016 (19 pages).
Case 2:16-cv-00856-RCJ-VCF, Document 46, Defendant 888's Reply in Support of Motion to Dismiss Plaintiffs' First Amended Complaint Under Fed. R. Civ. P. 12(B)(6), filed Sep. 26, 2016 (19 pages).
Case 2:16-cv-00856-RCJ-VCF, Document 54, "Order", filed Dec. 6, 2016 (8 pages).
Case 2:16-cv-00856-RCJ-VCF, Document 57, "Defendant 888's Holdings PLC's Answer to Plaintiffs' First Amended Complaint", filed Jan. 18, 2017 (67 pages).
Case 2:16-cv-00857-APG-VCF, Document 1, "Plaintiffs' Complaint for Patent Infringement" filed Apr. 2016 (29 pages).
Case 2:16-cv-00857-RCJ-VCF, Document 27, "Defendant Big Fish Games, Inc.'s Motion to Dismiss", filed Jun. 17, 2016 (30 pages).
Case 2:16-cv-00857-RCJ-VCF, Document 32, "[Corrected] Defendant Big Fish Games, Inc.'s Motion to Dismiss", filed Jul. 8, 2016 (30 pages).
Case 2:16-cv-00857-RCJ-VCF, Document 33, "Plaintiffs' Opposition to Big Fish Games, Inc.'s Motion to Dismiss", filed Jul. 25, 2016 (32 pages).
Case 2:16-cv-00857-RCJ-VCF, Document 34, "Reply in Support of Defendant Big Fish Games, Inc.'s Motion to Dismiss", filed Aug. 4, 2016 (17 pages).
Case 2:16-cv-00857-RCJ-VCF, Document 36, "Order" filed Aug. 29, 2016 (29 pages).
Case 2:16-cv-00857-RCJ-VCF, Document 37, "Plaintiffs' First Amended Complaint for Patent Infringement", filed Sep. 28, 2016 (38 pages).
Case 2:16-cv-00857-RCJ-VCF, Document 39, "Defendant Big Fish Games, Inc.'s Motion to Dismiss Plaintiffs' First Amended Complaint", filed Oct. 12, 2016 (17 pages).
Case 2:16-cv-00857-RCJ-VCF, Document 45, "Plaintiffs' Opposition to Big Fish Games, Inc.'s Motion to Dismiss", filed Oct. 31, 2016 (22 pages).
Case 2:16-cv-00857-RCJ-VCF, Document 49, "Reply in Support of Defendant Big Fish Games, Inc.'s Motion to Dismiss", filed Nov. 10, 2016 (16 pages).
Case 2:16-cv-00857-RCJ-VCF, Document 59, "Order", filed Jan. 4, 2017 (9 pages).
Case 2:16-cv-00857-RCJ-VCF, Document 60, "Defendant Big Fish Games, Inc.'s Answer to First Amended Complaint", filed Jan. 19, 2017 (17 pages).
Case 2:16-cv-00871-JAD-VCF, Document 1, "Plaintiffs' Complaint for Patent Infringement" filed Apr. 15, 2016 (39 pages).
Case 2:16-cv-00871-JAD-VCF, Document 23, "Plaintiffs' First Amended Complaint for Patent Infringement" filed Jul. 11, 2016 (57 pages).
Case 2:16-cv-00871-JAD-VCF, Document 31, "Motion to Dismiss Under 35 U.S.C. §101" filed Aug. 12, 2016 (16 pages).
Case 2:16-cv-00871-RCJ-VCF, Document 35, "Plaintiffs' Opposition to Defendants' Motion to Dismiss" filed Sep. 8, 2016 (25 pages).
Case 2:16-cv-00871-RCJ-VCF, Document 40, "Reply in Support of Motion to Dismiss Under 35 U.S.C. §101" filed Sep. 26, 2016 (14 pages).
Case 2:16-cv-00871-RCJ-VCF, Document 42, "Order" filed Oct. 18, 2016 (15 pages).
Case 2:16-cv-00871-RCJ-VCF, Document 46, "Motion for Reconsideration" filed Oct. 31, 2016 (7 pages).
Case 2:16-cv-00871-RCJ-VCF, Document 47, Motion to Dismiss Under Fed. R. Civ. P. 12(B)(6) filed Nov. 1, 2016 (7 pages).
Case 2:16-cv-00871-RCJ-VCF, Document 49, "Plaintiffs' Opposition to Defendants' Motion for Reconsideration", filed Nov. 17, 2016 (11 pages).
Case 2:16-cv-00871-RCJ-VCF, Document 50, "Plaintiffs' Opposition to Defendants' Motion to Dismiss", filed Nov. 17, 2016 (12 pages).

(56) References Cited

OTHER PUBLICATIONS

Case 2:16-cv-00871-RCJ-VCF, Document 55, Reply in Support of Defendants' Motion to Dismiss Under Fed. R. Civ. P. 12(B)(6), filed Nov. 30, 2016 (6 pages).
Case 2:16-cv-00871-RCJ-VCF, Document 56, "Reply in Support of Motion for Reconsideration" filed Nov. 30, 2016 (7 pages).
Case 2:16-cv-00871-RCJ-VCF, Document 63, "Order" filed Jan. 4, 2017 (10 pages).
Case 2:16-cv-00871-RCJ-VCF, Document 64, "Bwin's Answer to Plaintiffs' First Amended Complaint" filed Jan. 6, 2017 (15 pages).
Case 2:16-cv-00858-MMD-GWF, Document 1, "Plaintiffs' Complaint for Patent Infringement" filed Apr. 14, 2016 (30 pages).
Case 2:16-cv-00858-RCJ-VCF, Document 19, "Defendant Double Down Interactive LLC's Motion to Dismiss", filed Jun. 7, 2016 (32 pages).
Case 2:16-cv-00858-RCJ-VCF, Document 30, "Plaintiffs' Opposition to Double Down's Motion to Dismiss", filed Jul. 8, 2016 (31 pages).
Case 2:16-cv-00858-RCJ-VCF, Document 51, "Reply in Support of Defendant Double Down Interactive LLC's Motion to Dismiss", filed Jul. 18, 2016 (14 pages).
Case 2:16-cv-00858-RCJ-VCF, Document 58, "Plaintiffs' First Amended Complaint for Patent Infringement", filed Sep. 28, 2016 (38 pages).
Case 2:16-cv-00858-RCJ-VCF, Document 63, "Defendant Double Down Interactive LLC's Motion to Dismiss Plaintiffs' First Amended Complaint for Patent Infringement", Oct. 17, 2016 (31 pages).
Case 2:16-cv-00858-RCJ-VCF, Document 69, "Plaintiffs' Opposition to Double Down Interactive, Inc.'s Motion to Dismiss", filed Nov. 3, 2016 (24 pages).
Case 2:16-cv-00858-RCJ-VCF, Document 76, "Defendant Double Down Interactive LLC's Reply in Support of Motion to Dismiss Plaintiffs' First Amended Complaint for Patent Infringement", filed Nov. 14, 2016 (18 pages).
Case 2:16-cv-00858-RCJ-VCF, Document 83, "Defendant Double Down Interactive LLC's Answer, Defenses, and Counterclaims to Plaintiffs' First Amended Complaint for Patent Infringement", filed Jan. 18, 2017 (19 pages).
Case 2:16-cv-00858-RCJ-VCF, Document 84, "Plaintiffs' Answer to Double Down Interactive LLC's Counterclaims Against CG Technology Development, LLC", filed Feb. 8, 2017 (4 pages).
Case 2:16-cv-00781-RFB-CWH, Document 1, "Plaintiffs' Complaint for Patent Infringement" filed Apr. 7, 2016 (33 pages).
Case 2:16-cv-00781-MMD-CWH, Document 29, "Plaintiffs' First Amended Complaint for Patent Infringement" filed Jun. 13, 2016 (42 pages).
Case 2:16-cv-00781-MMD-CWH, Document 37, "Defendant's Motion to Dismiss Plaintiffs' Amended Complaint Under Fed.R. Civ. P. 12(B)(6)" filed Jul. 29, 2016 (38 pages).
Case 2:16-cv-00781-MMD-CWH, Document 44, "Defendants Motion for Protective Order Staying Discovery Pending Ruling on Motion to Dismiss" filed Aug. 22, 2016 (12 pages).
Case 2:16-cv-00781-MMD-CWH, Document 45, "Plaintiffs' Opposition to DraftKings, Inc.'s Motion to Dismiss" filed Aug. 24, 2016 (38 pages).
Case 2:16-cv-00781-MMD-CWH, Document 50, "Plaintiffs' Opposition to DraftKings, Inc.'s Motion to Stay" filed Sep. 8, 2016 (12 pages).
Case 2:16-cv-00781-MMD-CWH, Document 57, "Defendant's Reply in Support of it's Motion to Dismiss Plaintiffs' Amended Complaint Under Fed. R. Civ. P. 12(B)(6)" filed Sep. 26, 2016 (19 pages).
Case 2:16-cv-00781-MMD-CWH, Document 59, "Order" filed Sep. 27, 2016 (3 pages).
Case 2:16-cv-00781-RCJ-VCF, Document 64, "Plaintiffs Motion to Lift Stay" filed Nov. 23, 2016 (6 pages).
Case 2:16-cv-00781-RCJ-VCF, Document 69, "Order" filed Dec. 12, 2016 (11 pages).
Case 2:16-cv-00781-RCJ-VCF, Document 72, "DraftKings' Answer to Plaintiffs' First Amended Complaint and Affirmative Defenses" filed Dec. 27, 2016 (29 pages).

Case 2:16-cv-00801-JCM-VCF, Document 1, "Plaintiffs' Complaint for Patent Infringement" filed Apr. 8, 2016 (31 pages).
Case 2:16-cv-00801-RCJ-VCF, Document 31, "Plaintiffs' First Amended Complaint for Patent Infringement" filed Jun. 13, 2016 (48 pages).
Case 2:16-cv-00801-RCJ-VCF, Document 32, "Index of Exhibits to Plaintiffs' First Amended Complaint for Patent Infringement" filed Jun. 13, 2016 (3 pages).
Case 2:16-cv-00801-RCJ-VCF Document 44, "Defendant Fanduel, Inc's Motion to Dismiss for Failure to State a Claim Upon Which Relief Can be Granted" filed Jul. 14, 2016 (18 pages).
Case 2:16-cv-00801-RCJ-VCF Document 75, "Defendant Fanduel, Inc's Motion for Leave to Supplement Briefing Under LR 7-2(g)" filed Sep. 22, 2016 (3 pages).
Case 2:16-cv-00801-RCJ-VCF Document 77, "Plaintiffs' Opposition to Defendant Fanduel, Inc.'s Motion for Leave [ECF No. 75]" filed Oct. 11, 2016 (4 pages).
Case 2:16-cv-00801-RCJ-VCF Document 81, "Defendant Fanduel Inc.'s Notice of Withdrawal of Motion Seeking Leave to File Supplemental Briefing" filed Oct. 20, 2016 (3 pages).
Case 2:16-cv-00801-RCJ-VCF Document 86, "Plaintiffs' Second Amended Complaint For Patent Infringement" filed November 16, 2016 (70 pages).
Case 2:16-cv-00801-RCJ-VCF Document 87, "Defendant Fanduel's Answer to Plaintiffs' Second Amended Complaint and Affirmative Defenses" filed Nov. 30, 2016 (19 pages).
Case 2:16-cv-00801-RCJ-VCF Document 88, "Defendant's Partial Motion to Dismiss CGT's Second Amended Complaint for Failure to State a Claim Upon Which Relief Can Be Granted" filed Nov. 30, 2016 (14 pages).
Case 2:16-cv-00801-RCJ-VCF Document 94, "Plaintiffs' Opposition to Fanduel, Inc.'s Partial Motion to Dismiss" filed Dec. 19, 2016 (11 pages).
Case 2:16-cv-00801-RCJ-VCF Document 103, "Fanduel, Inc.'s Reply in Support of Partial Motion to Dismiss" filed Dec. 27, 2016 (7 pages).
Case 2:16-cv-00801-RCJ-VCF Document 113, "Order" filed Jan. 4, 2017 (11 pages).
Case 2: 16-cv-801-RCJ-VCF Document 114, "Transcript of Pretrial Conference" filed Dec. 2, 2016 (54 pages).
Petitioners' Reply to Patent Owner's Response for IPR2017-01333, U.S. Pat. No. 9,306,952 dated May 1, 2018.
Patent Owner's Submission Regarding Petitioner's Waived Challenges for IPR2017-01333, U.S. Pat. No. 9,306,952, filed May 22, 2018.
Patent Owner's Response for IPR2017-01333, U.S. Pat. No. 9,306,952, filed Jan. 29, 2018.
Patent Owner's Submission Regarding Petitioner's Waived Challenges for IPR2017-01532, U.S. Pat. No. 9,355,518, filed May 22, 2018.
Patent Owner's Response for IPR2017-01532, U.S. Pat. No. 9,355,518, filed Mar. 9, 2018.
Deposition of Garry Kitchen for IPR2017-01333, U.S. Pat. No. 9,306,952 dated Jan. 17, 2018.
Deposition of Dr. Robert Akl for IPR2017-01532, U.S. Pat. No. 9,355,518 dated Mar. 9, 2018.
Glossary of probability and statistics, Wikipedia, dated Mar. 5, 2018.
Van Nostrand's Scientific Encyclopedia, $3^{rd}$ Edition, published Jan. 1958.
*Notification of Transmittal of the International Search Report and the Written Opinion of the International Searching Authority, or the Declaration*, for International Application No. PCT/US06/26600, 8 pages, Jan. 19, 2007.
Examiner's Report for AU Application No. 2006269268 dated Sep. 7, 2009; 2 pages.
Notice of Acceptance for AU Application No. 2006269268 dated Jun. 2, 2011; 3 pages.
AU Examination Report for Application No. 2011224094; 5 pages; dated Nov. 25, 2011.
AU Examination Report No. 1 for App. No. 2013219208; dated May 18, 2015; 4 pages.

(56) References Cited

OTHER PUBLICATIONS

AU Examination Report No. 1 for App. No. 2016203150; dated Jul. 21, 2017; 5 pages.
AU Examination Report No. 1 for App. No. 2018205142; dated Jul. 4, 2019; 6 pages.
CA Examination Report for CA Application No. 2612896; dated Aug. 30, 2010; 4 pages.
CA Examination Report for CA Application No. 2612896; dated Feb. 24, 2014; 4 pages.
CA Examiner's Report for App. No. 2,612,896; dated Sep. 16, 2015; 4 pages.
CA Notice of Allowance for App. No. 2612896; dated Jan. 20, 2017; 3 pages.
EP Office Action for Application No. 06786672.3 dated Nov. 22, 2011; 7 pages.
JP Office Action for Application No. 2008-520420; dated Aug. 17, 2010; 11 pages total with English Translation.

* cited by examiner

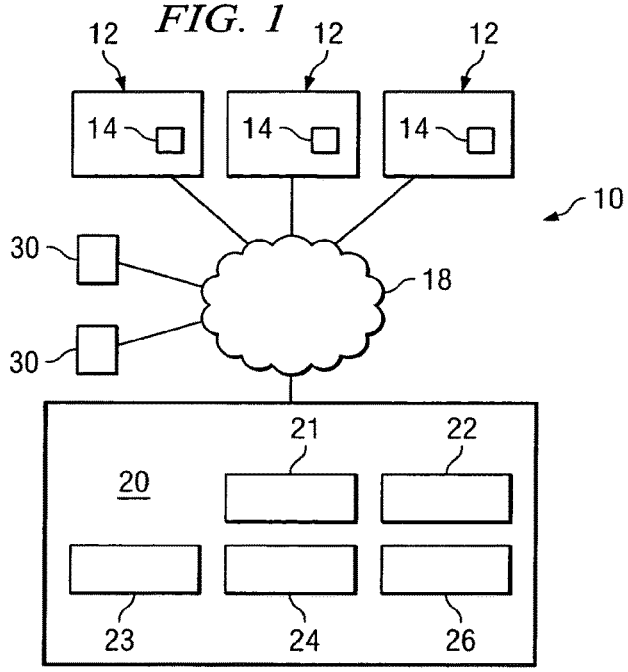
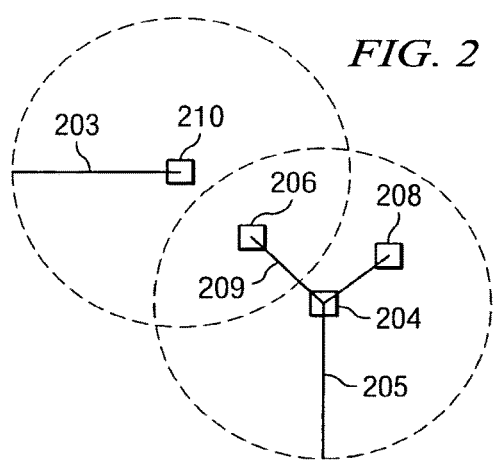
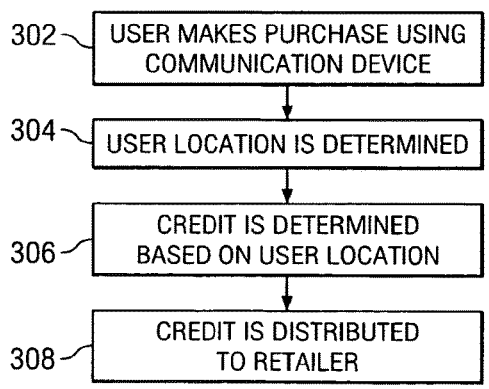

CREDIT ALLOCATION SYSTEM

RELATED APPLICATIONS

This application is a continuation of U.S. application Ser. No. 11/256,568, filed Oct. 21, 2005 now U.S. Pat. No. 7,811,172 and entitled "SYSTEM AND METHOD FOR WIRELESS LOTTERY", which is incorporated by reference herein in its entirety; which claims priority to U.S. Provisional Application Ser. No. 60/697,861 filed Jul. 8, 2005, entitled "Enhanced Wireless Gaming System," and to U.S. patent application Ser. No. 11/199,831 filed Aug. 9, 2005, now U.S. Pat. No. 7,637,810 which claims priority to U.S. Provisional Patent Application Ser. No. 60/697,861, filed Jul. 8, 2005, entitled "Enhanced Wireless Gaming System," and to U.S. application Ser. No. 11/063,311 filed on Feb. 21, 2005 now U.S. Pat. No. 8,161,967, entitled "System and Method for Convenience Gaming," which is a continuation-in-part of U.S. application Ser. No. 10/835,995 filed on Apr. 29, 2004 now U.S. Pat. No. 8,092,303, entitled "System and Method for Convenience Gaming," which claims priority to and incorporates in its entirety by reference U.S. Provisional Application Ser. No. 60/547,507 filed on Feb. 25, 2004 and U.S. Provisional Application Ser. No. 60/549,187 filed on Mar. 1, 2004.

This application is also a continuation-in-part of U.S. patent application Ser. No. 11/199,831 filed Aug. 9, 2005 now U.S. Pat. No. 7,637,810, which claims priority to U.S. Provisional Patent Application Ser. No. 60/697,861, filed Jul. 8, 2005, entitled "Enhanced Wireless Gaming System," and to U.S. application Ser. No. 11/063,311 filed on Feb. 21, 2005 now U.S. Pat. No. 8,616,967, entitled "System and Method for Convenience Gaming," which is a continuation-in-part of U.S. application Ser. No. 10/835,995 filed on Apr. 29, 2004 now U.S. Pat. No. 8,092,303, entitled "System and Method for Convenience Gaming," which claims priority to U.S. Provisional Application Ser. No. 60/547,507 filed on Feb. 25, 2004 and U.S. Provisional Application Ser. No. 60/549,187 filed on Mar. 1, 2004.

TECHNICAL FIELD

The present invention relates generally to the field of contests and, more particularly, to systems and methods for managing a wireless lottery.

BACKGROUND

Lotteries are generally known. In a lottery, a number of participants purchase tickets, each of which represents a chance to win a prize. In some cases, a portion of the revenue from ticket sales provides the winning prize. Many states have lotteries and the lotteries are typically run by the state. Most states have several different games, including instant-win scratch-off games, daily games and games where the participant must pick at least three or four correct numbers to win a prize. Often a lottery system will have a game with the largest possible payout, or prize. This game usually involves picking the correct six numbers from a set of numbers (e.g., from 1 to 50).

The odds of winning a prize may be calculated. The odds of picking a single correct number depend on how many possible numbers are available and how many have been used. For instance, assuming none of the six numbers has been picked and assuming there are 50 possible numbers to choose from, and assuming there will be six numbers selected overall, there are six chances to pick a given number correctly. The odds of picking one number correctly are, therefore, 50/6, or 8.33:1. Using a similar calculation, one can determine the odds of picking another number correctly after one number has already been drawn. There are 49 possible numbers left, and five more numbers will be drawn. So the odds of picking a number correctly after one has been drawn are 49/5, or 9.8:1. The odds may be calculated for picking the remaining numbers. The odds of picking all six numbers are then calculated by multiplying all of the odds for the individual numbers. The odds are: 50/6×49/5×48/4×47/3×46/2×45/1=15,890,700:1.

Winnings (prizes) may be determined and paid out according to various methods. For example, a state lottery might have a $10 million jackpot. The actual ticket revenues will be much higher than the jackpot. There are typically additional prizes that must be paid. Also, most states use a large portion of the lottery revenues to pay for various services and equipment. Lottery revenue may be used to pay for education, roads, disaster relief, human services programs, etc. Once it has been determined how much of the revenue will be left for the prize, the prize itself may be paid out in different ways, such as in an annual payment for some period of years, or in a lump sum.

Typically, lottery tickets are sold through retailers that are authorized by the states. The retailers are usually stores, such as convenience stores. A retailer is commonly paid a sales commission based on certain parameters. The parameters may include percentages, amounts sold, number of tickets sold, commission caps, and bonuses. In New York, for example, retailers are paid commissions of 6% of the sales of lottery tickets. Typically, a commission is paid as a percentage of the sale and is paid to the retailer making the sale.

SUMMARY

Certain embodiments of the present invention are generally directed to systems and methods for providing a wireless lottery. Tickets may be purchased using a wireless communication device. A problem arises in allowing consumers to purchase tickets using a wireless device in that there is not presently a satisfactory way to determine how sales commissions will be paid. For example, if a customer uses a mobile phone to make a purchase, then the customer has not purchased the ticket directly from a retailer. Therefore, without an acceptable solution, as presented by the various embodiments described herein, a retailer that might have otherwise sold a ticket to the customer might lose the sales commission for that ticket.

In one embodiment a contest system is provided. The system includes a contest platform operable to receive purchase information corresponding to the purchase of one or more contest entries. The purchase may be made using an electronic communication device. The system also includes a location determination module operable to determine a location of the electronic communication device. The contest platform is also operable to determine one or more sales commissions associated with the purchase based at least partially on the location of the electronic communication device. The purchase may be, for example, the purchase of a lottery ticket.

In another embodiment, an electronic communication device is provided that may be used to make a purchase (e.g., of a lottery ticket). The device includes a receiver, a transmitter, and a data input device. The data input device receives input from a user. The input corresponds to the purchase of a contest entry. The transmitter is operable to transmit the input to a contest platform, and is further operable to transmit a signal useable by the platform to determine the location of the electronic communication device. The platform may further determine a sales commission for the purchase based at least partially on the location.

In another embodiment a purchasing system is provided. The purchasing system includes a purchase management platform operable to receive purchase information corresponding to the purchase of one or more items. The purchase may be made using an electronic communication device. The purchasing system may include a location determination module operable to determine a location of the electronic communication device. The purchase management platform may also be operable to determine one or more credits associated with the purchase based at least partially on the location of the electronic communication device.

In another embodiment, a method is provided for determining credit for a sale made using an electronic communication device. One step involves determining a location of the electronic communication device. Another step involves determining the credit based at least partially on the location.

Various embodiments of the present invention may benefit from numerous advantages. It should be noted that one or more embodiments may benefit from some, none, or all of the advantages discussed below.

One advantage is that contest entries, such as lottery tickets, may be purchased wirelessly and that associated retailer commissions may be fairly determined and distributed. Another advantage is an increase in purchases due at least partially to the convenience of being able to make purchases using the electronic communication device. Another advantage is that data associated with purchases, such as location data, may be determined, captured, stored, and processed to create additional related data and/or to enable the execution of on or more events related to the purchase information. Another advantage is that retailers can send messages to users that make purchases using the electronic device and these messages may be based at least partially on the user location and may also be associated with the type of item (e.g., lottery ticket) being purchased.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 1 illustrates a wireless lottery system according to an embodiment of the present invention;

FIG. 2 illustrates a wireless lottery sales commission distribution plan according to an embodiment of the present invention; and FIG. 3 illustrates a wireless lottery method according to an embodiment of the present invention.

DETAILED DESCRIPTION

Various embodiments are generally directed to systems and techniques to provide lottery services. In certain cases, the services are performed wirelessly. Accordingly, a system may be configured to offer and manage wireless lottery activities. According to one feature, the system is configured to determine which lottery retailer should be credited for a wireless sale of a lottery ticket. For example, a user may view the wireless lottery option as a seamless transaction with no apparent distinction as to lottery ticket retailers. However, based on one or more parameters, the system determines one or more retailers that should be credited, or share in the credit, for a particular sale of a lottery ticket. This may be accomplished, for instance, by determining the location of the wireless purchaser when the purchase is made. A system may then determine the appropriate lottery retailer to be credited based on the purchaser location. For example, the system may be configured to credit the retailer closest to the purchaser at the time of the transaction. Optionally, the system may be configured to credit all retailers within a particular range of the purchaser. Alternatively, the purchaser may establish a "home" retailer as the credited retailer. The home retailer is then credited regardless of where the purchaser is located.

Alternatively, the system may be configured to enable the purchaser to purchase a ticket only when certain criteria are met. For example, a purchase may be made with the user is within a certain distance from an advertisement (e.g., a billboard) and when the user enters an appropriate code on the device. In such a case, the retailer(s) associated with the advertisement and/or the code may be credited with the sale of the lottery ticket. In another example, the system may be configured to determine when a purchaser enters a particular property (e.g., the parking lot of a particular convenience store). The system may permit the purchaser to purchase a ticket remotely (e.g., from the car) once the purchaser is located within certain boundaries or within a certain range of some predetermined point.

According to certain related aspects, merchants that sell the wireless lottery tickets, or are credited with the sale, may, within a certain range, send messages (e.g., advertisements) back to the user who is purchasing a ticket. For example, if a user purchases a ticket, the four agents within ¼ mile of the purchaser may be allowed to send a message to the user, which is viewable on the user's device. One of the merchants might send a message, for example, that indicates the merchant will give the user a free coffee if the user comes in for a visit. The message may also include directions to the merchant's store. The wireless lottery services may be provided as an add-on, or ancillary service, in conjunction with a basic telecommunications service.

As shown in FIG. 1, for example, lottery system 10 includes one or more communication devices 12, each having a display 14 to allow a user to interact with system 10 as described herein. Communication devices 12 communicate with other elements of system 10 over a communications network 18. Also included in system 10 are one or more retailers 30, which may be (for example) stores that sell goods and/or services. Retailers 30 may be credited with sales made through devices 12 according to the various parameters and methods described herein. System 10 also includes a lottery management platform 20. Platform 20 includes at least one processor 21, at least one memory 22, and at least one network interface 23. Platform 20 also includes a location determination module 24 for determining the location of the one or more communication devices 12, and a commission determination module 26 for determining commissions (or other credit) for sales made using the devices 12.

Communication devices 12 may include any devices that are capable of receiving and transmitting information, such as voice and/or data information, electronically. Communication devices 12, may have a display 14 for displaying, for example, a graphic user interface (GUI) to allow a user to perform various actions permitted by the system 10. These various actions may be related to any of the various aspects of purchasing lottery tickets and communicating information between a device 12 and any of the other components of system 10.

It should be understood that although certain embodiments are described in terms of the sales of lottery tickets, various embodiments have applicability to sale of any entry including, without limitation, contest entries, state lotteries, scratch-off lotteries, instant lotteries. Also applicable are the sales of entertainment tickets such as concert tickets and sporting event tickets. Also applicable are sales of any other product or service for which a commission may be paid. This includes sales of goods and property, sales of travel related services, sales of securities and other investment vehicles, etc.

Communication devices 12 may be wireless communication devices, but the present invention is not so limited. Devices 12 may include, without limitation, mobile phones, personal data assistants (PDAs), computers, mini-computers, etc. Communication devices 12 may transmit and receive information to and from communications network 18. Information is also transmitted between network 18 and platform 20. Information may also be transmitted between any of these components and one or more retailers 30.

Information transmitted across network 18 may include any information, in any format, which is necessary or desirable in the operation of the wireless lottery system. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are within the scope of the present invention. Further, it will be understood that additional components may be used in the communication of information between users, retailers, and the wireless lottery platform. Such additional components may include, without limitation, lines, trunks, antennas, switches, cables, transmitters, receivers, computers, routers, servers, fiber optical transmission equipment, repeaters, amplifiers, etc.

According to one embodiment, the communications network comprises a cellular network. The cellular network comprises a plurality of base stations, each of which has a corresponding coverage area. Base station technology is generally known and the base stations may be of any type found in a typical cellular network. The base stations may have coverage areas that overlap. Further, the coverage areas may be sectorized or non-sectorized. The network also includes mobile stations, which function as the communication devices 12 used by users to access the lottery platform and participate in the lottery activities. Users are connected to the network of base stations via transmission and reception of radio signals. The communications network also includes at least one voice/data switch, which may be connected to the wireless portion of the network via a dedicated, secure landline. The lottery platform 20 may likewise be connected to the voice/data switch via a dedicated, secure landline. The voice/data switch may be connected to the wireless network of base stations via a mobile switching center (MSC), for example, and the landline may be provided between the voice/data switch and the MSC.

Users access the lottery platform and or system by way of mobile stations which are in communication with, and thus part of, the communications network. The mobile station may be any electronic communication device that is operable in connection with the network as described. For example, in this particular embodiment, the mobile station may comprise a cellular telephone.

In the case of a cellular network for example, the lottery system may be enabled through the use of a private label carrier network. Each base station is programmed by the cellular carrier to send and receive private secure voice and/or data transmissions to and from mobile station handsets. The handsets are preferably pre-programmed with both gaming software and the carrier's authentication software. The base stations communicate via Private T-1 lines to a switch. Encryption can be installed on the telephones if required by a regulating authority.

The cellular network may be a private, closed system. Mobile stations communicate with base stations and base stations are connected to a centralized switch. At the switch, voice calls are transported either locally or via long distance. Specific service provider lottery traffic is transported from the central switch to a lottery server at a host location.

As users begin a lottery activity, the handset will only talk to certain base stations with cells or sectors that have been engineered to be wholly within the jurisdiction permitting and/or controlling the applicable lottery. For example, if a base station is close enough to pick up or send a signal across state lines, it might not be able to communicate with the device. When a customer uses the device for lottery activities, the system may prohibit, if desired, the making or receiving voice calls. Moreover, voice can be eliminated entirely if required. Further, the devices might not be allowed to "connect" to the Internet. This ensures a high level of certainty that purchase of lottery tickets originates and terminates within the boundaries of an applicable lottery jurisdiction and the "private" wireless system cannot be circumvented or bypassed. In certain embodiments some data and/or voice traffic may be communicated at least partially over the Internet. Alternatively, in some embodiments, certain non-lottery information may be transported over a path which includes the Internet, while other information relating to the lottery activities of the system is transported on a path that does not include the Internet. In still other embodiments, even lottery information may be transported either wholly or partially over the Internet. This might be the case, for example, in jurisdictions which allow the purchase of lottery tickets over the Internet.

In another embodiment, for example, the communications network comprises a private wireless network. The private wireless network may include, for example, an 802.11x (WiFi) network technology. Various WiFi networks may comprise the communication network. The networks may use other communications protocols to provide a private wireless network including, but not limited to, 802.16x (WiMax) technology. Also, system 10 may comprise a combination of networks. For example, system 10 may comprise a combination of private wireless networks, a cellular network comprising a multi-channel access unit or sectorized base station, and a satellite network comprising one or more satellites With respect to the private wireless network, because certain technology covers smaller areas, (e.g., in the range of 100-300 feet) and provides very high-speed throughput, the private wireless network is particularly well-suited for any jurisdictional needs of location and identity verification. It should be understood that the configuration and description of the overall lottery system 10 is intended only as an example and may be modified within the scope of the present invention.

In one embodiment, the system architecture for the lottery system includes:

(1) a wireless LAN (Local Access Network) component, which consists of mostly 802.11x (WiFi) and/or 802.16x WiMax technologies; robust security and authentication software; gaming software; mobile carrier approved handsets with Windows® or Symbian® operating systems integrated within;

(a) CDMA-technology that is secure for over-the-air data protection;

(b) at least two layers of user authentication, (that provided by the mobile carrier and that provided by the lottery platform provider);

(c) compulsory tunneling (static routing) to gaming servers;

(d) end-to-end encryption at the application layer; and (e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;

(3) private MAN (Metropolitan Access Network) T-1 and T-3 lines to provide connectivity where wireless services cannot reach; and (4) redundant private-line communications from the mobile switch back to the lottery platform.

As further shown in FIG. 1, communication devices 12 are in communication with a lottery management platform 20 over network 18. The lottery management platform 20 preferably has one or more servers or processors 21, on which are resident various lottery and lottery management applications. These applications may include, for example, a lottery sales application, a commission determination application, a location determination application, a lottery transaction tracking application, and an information transmission application. These applications may be embodied in one or more software modules. The applications may be combined in any possible configuration. Additionally, it should be understood that these applications are not exhaustive and that other applications may exist to provide an environment to the user that is associated with any of the described or potential lottery activities. Processor 21 is operable to execute any of the software, routines, applications, etc. associated with the various functionality or modules described herein. Processor 21 may be any suitable processor, computer, server, etc., or any combination thereof.

Platform 20 also includes at least one memory 22. Memory 22 is operable store any data, software, parameters, etc. necessary for system 10 to perform the various tasks described herein. Memory 22 may store, for example, user IDs for the various users of communication devices 12, percentages and other parameters used to determine commissions, locations of fixed elements of system 10 such as the locations of the one or more retailers 30, etc. Memory 22 may be any suitable memory including one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Platform 20 also includes at least one network interface 23 for receiving information from, and transmitting information to, other components or elements within system 10.

Lottery management platform 20 includes a location determination module 24, which is operable to determine the location of a communication device 12. An associated verification application may be additionally operable to permit or disable the purchase of a lottery ticket (or the conduct of other lottery activities) from a particular location depending upon whether or not the location meets one or more criteria. The criterion may be, for example, whether the location is within a pre-defined area in which lottery sales are permitted by law.

The location determination technology used in the determination module 24 may include, without limitation, "network-based" and/or "satellite-based" technology. Network-based technology may include such technologies as multilateration, triangulation and geo-fencing, for example. Satellite-based technologies may include global positioning satellite (GPS) technology, for example.

As previously discussed, a cellular approach may include the use of at least one cellular, mobile, voice and data network. For lottery activities in certain jurisdictions, the location determination technology may involve triangulation, global positioning satellite (GPS) technology, and/or geo-fencing to avoid the potential for lottery activities to be undertaken outside applicable boundaries. Triangulation may be used as a method for determining location of a communication device 12. Triangulation may be accomplished, for example, by comparing the signal strength from a single mobile station received at multiple base stations, each having GPS coordinates. This technology may be used to pinpoint the location of a mobile station (i.e., a communication device). The location can then be compared to a map or other resource to determine whether the user of the mobile station is in an unapproved area. Alternatively, GPS technology may be used for these purposes.

Any suitable type of location determination techniques may be used to determine the location of device 12, to determine whether a device 12 may be used to participate in the various lottery activities described herein, and/or to determine credit for sales based on device location. Such techniques include, without limitation, the following.

One technique that may be used is "geo-fencing." Geo-fencing may be used, for example, to disable a device that is not within specified boundaries. Geo-fencing does not specify location. Rather, it ensures that a mobile station is within certain boundaries. For instance, geo-fencing may be used to ensure that a mobile station beyond state lines does not access the lottery system 10. Triangulation is another technique that may be used. Triangulation specifies a pinpoint, or near-pinpoint, location of the device. For example, a device might be triangulated between three base stations to determine the location of the device. Triangulation may be used to identify whether a device, such as a mobile station, is located in a specific area. The location determination technology utilized in conjunction with the present invention may be specified to meet the Federal Communication Commission's (FCC's) Phase 2 E911 requirements. Geological Institute Survey (GIS) mapping may also be utilized to compare identified coordinates of a communication device with GIS map features or elements to determine whether a device is in a particular area. It should be noted that any type of location verification may be used such as triangulation, geo-fencing, global positioning satellite (GPS) technology, signal strength comparisons, time difference of arrival (TDOA) or any other type of location determining technology, which can be used to ensure or provide an acceptable level of confidence, that the user is in a particular location or within specified boundaries.

In another embodiment, location verification is accomplished using channel address checking or location verification using some other identifying number or piece of information indicative of which network or portion of a network is being accessed by the communication device. Assuming the using of an identifying number for this purpose, then according to one method of location checking, as an example, a participant accesses the lottery system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the lottery platform. In a related embodiment, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant lottery activity. Preferably the lottery platform either maintains, or has access to, a database that maps the various possible worldwide mobile network identifying numbers to geographic areas. The invention contemplates using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In another embodiment, when the user connects his mobile telephone to the lottery platform, the lottery platform draws the network identifying information. Software resident on the communication device may incorporate functionality that will, upon login or access by the user, determine the user's location (based at least in part on the identifying information) and send a message to the lottery platform. The identifying number or information used to determine location may be country-specific, state-specific, town-specific, or specific to some other definable boundaries.

In connection with any of the location determination methods, the lottery platform may periodically update the location determination information. This may be done, for example, during a lottery transaction, or at pre-defined time intervals, to ensure that movement of the communication device to an unauthorized area is detected during lottery activities, and not just upon login or initial access.

Thus, depending on the location determination technology being used, the decision whether to permit or prohibit a lottery activity may be made at the communication device, at the lottery platform, or at any of the components of the telecommunication network being used to transmit information between the platform and the communication device (such as at a base station, for example).

Lottery platform 20 also includes a commission determination module 26. Among other thing, commission determination module 26 determines the commissions payable to one or more retailers. The determination may be made, at least in part, based on the location of one or more communication devices 12 (as determined, for example, by location determination module 24). It should be understood that all modules and/or components illustrated within platform 20 may be separate, integrated, centralized, remote, overlapping, or in any other configuration so long as the functionality of the modules is provided.

Commission determination module 26 may determine that a retailer 30 that is closest to a particular device 12, which was used to purchase a lottery ticket, is to be credited with the sale of that ticket. Thus, that particular retailer would be entitled to any applicable commission based on that sale. It should be understood that the term "retailer" is not meant to be limiting. A retailer can be any distributor of lottery tickets (or other contest entries or other goods or services being purchased). A retailer can be an individual, a store, a government agency, a distributor, a kiosk, etc. In another embodiment, the commission determination module may be operable to determine a commission based on the location of one or more retailers within a certain distance from one or more communication devices 12, such as the particular device 12 used to purchase a ticket. For example, location determination module 24 may determine the location of a device 12 used to purchase a ticket. Commission determination module 26 may determine that two retailers 30 are within a predetermined (e.g., 5 mile) radius of the communication device 12. Commission determination module 26 may further determine that the commission for the sale of the ticket will be split between the two retailers 30.

Commission determination module 26 may use additional parameters to determine the appropriate commission. Such parameter may include, without limitation, location of one or more devices 12; location of one or more retailers 30; distances from one or more devices 12 to one or more retailers 30; pre-selected user preferences; day, date and time information; zone boundaries; prorating parameters, percentages, etc.

According to another embodiment, predetermined zones may be established. If a purchase is made using a device in a particular zone, it may be determined that all or a subset of the retailers in that zone are credited with the sale.

According to another embodiment, commission determination module 26 may prorate commissions between multiple retailers based on their respective distances to the device 12 that was used to make the purchase. According to a related example, module 26 may determine the commissions based on predetermined percentages according to which the various retailers (e.g., all of the retailers within 5 miles of the device 12) should be entitled to a commission. For example, certain stores might be entitled to greater percentages than other stores.

According to at least one embodiment, a user of a device 12 may pre-select one or more retailer to be a "home" retailer. This might be a retailer, for example, that the user frequents in person. When the device 12 is used by that particular user to purchase a lottery ticket, the home retailer is credited with the sale. This feature may be independent of, or combined with, the other parameters described herein. For example, the home retailer may be credited regardless of the location of the device 12. As an alternative example, the home store is credited together with, but at a higher percentage than, additional retailers that are all within a certain distance from the device 12.

According to another embodiment, a user of a device 12 may only be able to make a purchase using the device when the device is within a certain distance from a particular point. For example, the user might have to be within a certain distance from a billboard advertising the lottery. If a purchase is made within a certain distance from the point, a predetermined recipient is credited with the sale (and thus any commission). In this case, the advertiser might be credited with the commission, or at least a portion thereof.

According to a related aspect, users might be presented with one or more possible codes which must be entered on the communication device GUI in order to make a purchase. For example, a code may be displayed on a billboard, or on an advertisement in a store, or on an advertisement on a particular television station. If the user enters a particular code in conjunction with the purchase of the ticket, then the entity associated with the code (e.g., the advertiser, the store where the advertisement is located, or the media entity providing the code) is credited with the sale and the resulting commission.

It should be understood that the term "commission" is not limited to any particular type of commission. Commission may simply mean, in some embodiments, recognition or credit for a sale. Commissions may be financial commissions paid, for example, as a percentage of the sale. Commissions may also be other types of incentives, including other types of financial incentives, such as bonuses, which are determined based on any suitable parameters.

FIG. 2 illustrates an example of the operation of the location determination module 24 in conjunction with the operation of the commission determination module 26. As shown, there are two communication devices 210 and 204, respectively. There are also two retailers 206 and 208, respectively. According to an example, a lottery ticket may be purchased using device 210. Location determination module 24 may determine that device 210 is at a particular location. Commission determination module 26 may retrieve information regarding the location of various retailers to determine that retailer 206 is the only retailer within a certain predetermined radius 203 of device 210. Thus, commission determination module 26 may determine that retailer 206 is entitled to the credit for, and any commissions resulting from, the sale of the lottery ticket which was made using device 210.

In another example illustrated by FIG. 2, a lottery ticket may be purchased using device 204. In this case, location determination module 24 determines the location of device 204. Commission determination module 26 may determine (based on stored information, for example) the locations of various retailers and may further determine that retailers 206 and 208 are the only retailers within a certain radius 205 from device 204. Commission determination module 26 may then determine that the credit and commission for the sale is to be equally divided between retailers 206 and 208.

Alternatively, it may be determined that retailer 206 is a first distance 209 from device 204 and retailer 208 is a second distance 207 from device 204. It may be further determined that second distance 207 is shorter than first distance 209. It may be consequently determined that retailer 208 is closer to device 204 than is retailer 206 and, therefore, retailer 208 is entitled to the commission.

Alternatively, it may be determined that second distance 207 is half the distance of first distance 209. It may be further determined that the commission will be divided between retailers 206 and 208, but prorated ⅓ to retailer 206 and ⅔ to retailer 208. It should be appreciated that numerous examples for determining the commission based at least partially on the retailer and user locations may be incorporated into the various embodiments as described herein.

FIG. 3 illustrates an example method for determining commissions for the sale of a lottery ticket. Although the method shows various steps in a certain order, the invention is not so limited. Steps may be added, removed, and altered, and the order of the various steps may be change.

In the illustrated example, the method begins with step 302 in which a user makes a purchase using a communication device. The purchase may be, for example, the purchase of a lottery ticket. Any of the other types of purchases described herein are contemplated.

In step 304, the location of the user is determined. This may be accomplished using any of the components and any of the techniques described herein. Preferably, the location is determined based on the location of the user's communication device at the time the purchase is made. However, the location may be determined at another time or according to other criteria.

In step 306, a credit (e.g., a sales commission) is determined based at least partially on the user location. Again, the credit may be any type of financial or non-financial credit, commission, payment, bonus or recognition. The credit may be determined based on any of the techniques and according to any of the additional parameters discussed herein.

In step 308, the credit, as determined in step 306, is distributed to one or more retailers. The distribution may be accomplished according to any suitable payment method including cash, check, money or wire transfer, credit, etc. Other distributions are envisioned such as would be applicable to a non-financial credit. The credit may also be distributed by the creation of a record corresponding to the purchase and linking the retailer to the record (e.g., by use of a retailer ID).

Although various embodiments of the invention and its advantages have been described in detail, a person skilled in the art could make various alternations, additions, and omissions without departing from the spirit and scope of the present invention as defined by the appended claims.

For example, according to a related aspect, at least certain embodiments may incorporate a messaging function. According to the messaging function, a retailer or the lottery platform may send messages to one or more of the users. The messages may be, for example, alerts, advertisements, promotions, confirmations, etc. Messages might be predetermined based on distance or proximity of the user to one more other elements of system 10 (such as a retailer). As an example, a retailer that is credited with the commission for the sale of a lottery ticket made using a device 12 may generate a message to the user of device 12. The message might thank the user for making the purchase and invite the user to the retailer's location for a free drink. The message may also include directions to the merchant's store. According to certain related aspects, merchants that sell the wireless lottery tickets may, within a certain range, send messages (e.g., advertisements) back to the user who is purchasing the ticket. For example, if a user purchases a ticket, the four agents within ¼ mile of the purchaser may be allowed to send a message to the user, which is viewable on the user's device.

According to another aspect, the system may be configured to determine when a user enters a particular property (e.g., the parking lot of a particular convenience store). The system may permit the user to purchase a ticket remotely (e.g., from the car) once the user is located within certain boundaries or within a certain range of some predetermined point.

According to another aspect, the lottery services described herein may be provided as an add-on, or ancillary service, in conjunction with a basic telecommunications service.

What is claimed is:

1. A method comprising:
receiving, by at least one processor, a location determination signal from a mobile electronic communication device over a communication network, in which the location determination signal is from using at least one of network-based technology or satellite-based technology;
controlling, by the at least one processor, enabling and disabling a sale activity using the mobile electronic communication device, based on whether a location of the mobile electronic communication device determined from the location determination signal is within a predefined zone;
while the location is determined to be within the predefined zone, enabling, by the at least one processor, the sale activity using the mobile electronic communication device, in which the sale activity using the mobile electronic communication device is disabled when the location is determined to be outside the predefined zone;
determining, by the at least one processor, for each of a plurality of retailers, a distance between (a) a location of the mobile electronic communication device at a time of a sale using the mobile electronic communication device when the sale activity is enabled, the location of the mobile electronic communication device at the time of sale determined from the location determination signal, and (b) a location of the respective retailer;
determining, by the at least one processor, a respective credit for each of the plurality of retailers based at least partially on the determined distance between the location of the mobile electronic communication device at the time of the sale and the location of each respective retailer; and
causing the respective credit to be provided to each of the plurality of retailers.

2. The method of claim 1, wherein the determining the respective credits comprises:
determining, based on the determined distance between (a) the location of the mobile electronic communication device at the time of the sale and (b) the location of each respective retailer, one or more of the plurality of retailers that are within a predetermined range of the location of the mobile electronic communication device at the time of the sale.

3. The method of claim 1, wherein the credits provided to the plurality of retailers are equal in value.

4. The method of claim 1, wherein the determining the respective credits comprises:
determining a sales commission for the sale; and
dividing the sales commission among the plurality of retailers according to predetermined percentages based on the determined distance between (a) the location of the mobile electronic communication device at the time of the sale and (b) the location of each respective retailer.

5. The method of claim 1, wherein the determining the respective credits comprises:
determining a sales commission for the sale; and
prorating the sales commission among the one or more retailers based on the determined distance between (a) the location of the mobile electronic communication device at the time of the sale and (b) the location of each respective retailer.

6. The method of claim 1, further comprising sending, by the at least one processor, a message to a user of the mobile electronic communication device, in which the message comprises at least one of a promotion or a confirmation of the sale.

7. The method of claim 1, further comprising:
receiving, by the at least one processor, purchase information from the mobile electronic communication device,
wherein the purchase information comprises a code, and
wherein the determining the respective credits is performed based at least in part on the code.

8. The method of claim 1, further comprising receiving, by the at least one processor, purchase information from the mobile electronic communication device, wherein:
the purchase information comprises a code;
the code is associated with an entity; and
a credit associated with the sale is provided to the entity.

9. The method of claim 8, wherein the entity is an advertiser.

10. The method of claim 8, wherein the entity is a media provider.

11. The method of claim 10, wherein the code is provided on media distributed by the media provider.

12. The method of claim 1, further comprising:
in which the sale activity using the mobile electronic communication device is enabled based on a determination that the location of the mobile electronic communication device determined from the location determination signal is within a certain predetermined distance from a predetermined second location.

13. The method of claim 12, wherein the predetermined second location corresponds to the location of an advertisement.

14. The method of claim 1, wherein the sale is a sale of a lottery ticket.

15. The method of claim 1, wherein the sale comprises at least one of a sale of a contest entry, a sale of a security, a sale of an investment instrument, or a sale of services.

16. The method of claim 1,
in which the determining the respective credits comprises:
determining a shortest distance between (i) the mobile electronic communication device at the time of the sale and (ii) the plurality of retailers; and
determining the credits based at least in part on the determined shortest distance.

17. The method of claim 1, further comprising:
executing at least one contest activity,
in which the at least one contest activity comprises determining the location of the mobile electronic communication device at the time.

18. An apparatus, comprising:
at least one processor; and
a memory that stores instructions which, when executed by the at least one processor, direct the at least one processor to perform a method comprising:
receiving a location determination signal from a mobile electronic communication device over a communication network, in which the location determination signal is from using at least one of network-based technology or satellite-based technology;
controlling enabling and disabling a sale activity using the mobile electronic communication device, based on whether a location of the mobile electronic communication device determined from the location determination signal is within a predefined zone;

while the location is determined to be within the predefined zone, enabling the sale activity using the mobile electronic communication device, in which the sale activity using the mobile electronic communication device is disabled when the location is determined to be outside the predefined zone;

determining, for each of a plurality of retailers, a distance between (i) a location of the mobile electronic communication device at a time of purchase of one or more contest entries using the mobile electronic communication device when the sale activity is enabled, the location of the mobile electronic communication device at the time of purchase determined from the location determination signal, and (ii) a location of the respective retailer, in which a location of each of a plurality of retailers is stored in a memory; and determining one or more sales commissions associated with the purchase for at least one of the plurality of retailers based at least partially on the determined distances between the location of the mobile electronic communication device at the time of purchase and the respective locations of each of the at least one of the plurality of retailers.

* * * * *